(12) United States Patent
Kim et al.

(10) Patent No.: US 11,246,095 B2
(45) Date of Patent: Feb. 8, 2022

(54) METHOD FOR TRANSMITTING OR RECEIVING FRAME IN WIRELESS LAN SYSTEM AND DEVICE THEREFOR

(71) Applicant: LG Electronics Inc., Seoul (KR)

(72) Inventors: Jeongki Kim, Seoul (KR); Suhwook Kim, Seoul (KR); Kiseon Ryu, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/627,213

(22) PCT Filed: Jun. 28, 2018

(86) PCT No.: PCT/KR2018/007334
§ 371 (c)(1),
(2) Date: Dec. 27, 2019

(87) PCT Pub. No.: WO2019/004741
PCT Pub. Date: Jan. 3, 2019

(65) Prior Publication Data
US 2020/0120607 A1 Apr. 16, 2020

Related U.S. Application Data

(60) Provisional application No. 62/539,559, filed on Aug. 1, 2017, provisional application No. 62/535,984, filed on (Continued)

(51) Int. Cl.
*H04W 52/02* (2009.01)
*H04W 84/12* (2009.01)

(52) U.S. Cl.
CPC ... *H04W 52/0229* (2013.01); *H04W 52/0216* (2013.01); *H04W 52/0222* (2013.01); *H04W 84/12* (2013.01)

(58) Field of Classification Search
CPC ......... H04W 52/0229; H04W 52/0216; H04W 52/0222; H04W 84/12; H04W 76/28; (Continued)

(56) References Cited

U.S. PATENT DOCUMENTS 8,937,893 B1   1/2015  Nemavat
10,856,228 B1* 12/2020  Chu .................. H04W 52/0235
(Continued)

FOREIGN PATENT DOCUMENTS

KR    2014005407    5/2014

OTHER PUBLICATIONS

Huang et al., "Indication for WUR Duty Cycle", IEEE 802.11-17/0651r2, May 8, 2017, 13 pages.
(Continued)

*Primary Examiner* — Marcos L Torres
(74) *Attorney, Agent, or Firm* — Fish & Richardson P.C.

(57) ABSTRACT

According to one embodiment of the present disclosure, a method by which a station (STA) receives a wake-up radio (WUR) frame in a wireless LAN (WLAN) comprises the steps of: entering a WUR duty cycle mode in which an on-duration for which a WUR receiver of the STA is awake and an off-duration for which the WUR receiver of the STA is sleeping are alternately repeated; and turning on a primary connectivity radio (PCR) when a WUR frame is detected in the on-duration of the WUR duty cycle mode, wherein, when the WUR frame indicates reception of a PCR beacon frame or a delivery traffic indication map (DTIM), the STA can turn on the PCR after delaying a predetermined time from the detection of the WUR frame according to a time point at which the PCR beacon frame or the DTIM is transmitted.

6 Claims, 26 Drawing Sheets

Related U.S. Application Data on Jul. 24, 2017, provisional application No. 62/528,551, filed on Jul. 5, 2017, provisional application No. 62/525,788, filed on Jun. 28, 2017.

(58) Field of Classification Search
CPC . H04W 88/06; H04W 76/27; H04W 52/0235; H04W 52/02; Y02D 30/70
See application file for complete search history.

(56) References Cited

U.S. PATENT DOCUMENTS

| | | |
|---|---|---|
| 2013/0034004 A1 | 2/2013 | Mannemala et al. |
| 2015/0365885 A1 | 12/2015 | Yang et al. |
| 2018/0234918 A1* | 8/2018 | Asterjadhi ........ H04W 52/0229 |
| 2020/0037251 A1* | 1/2020 | Du ...................... H04W 28/065 |

OTHER PUBLICATIONS

Wu et al., "WUR duty cycle mode and timing synchronization", IEEE 802.11-17/0371r4, Mar. 15, 2017, 15 pages.

Extended European Search Report in European Appln. No. 18823771.3, dated May 29, 2020, 10 pages.

Kim et al., "WUR MAC issues follow-up," IEEE 802.11-17/0381r0, Mar. 11, 2017, 16 pages.

\* cited by examiner (a)

| Frame Type | TX ID | (RX ID) | Wake-up reason | Others (e.g.,DTIM count) | FCS |

FIG. 24

| Frame Type | TX ID | Timestamp | Wake-up indicator | Others (e.g.,DTIM count) | FCS |

METHOD FOR TRANSMITTING OR RECEIVING FRAME IN WIRELESS LAN SYSTEM AND DEVICE THEREFOR

CROSS-REFERENCE TO RELATED APPLICATIONS

This application is a National Stage application under 35 U.S.C. § 371 of International Application No. PCT/KR2018/007334, filed on Jun. 28, 2018, which claims the benefit of U.S. Provisional Application No. 62/539,559, filed on Aug. 1, 2017, U.S. Provisional Application No. 62/535,984, filed on Jul. 24, 2017, U.S. Provisional Application No. 62/528,551, filed on Jul. 5, 2017, and U.S. Provisional Application No. 62/525,788, filed on Jun. 28, 2017. The disclosures of the prior applications are incorporated by reference in their entirety.

BACKGROUND

Technical Field

The present description relates to a wireless LAN system and, more specifically, to a method for transmitting or receiving a PPDU through wake-up radio and a device therefor.

Related Art

IEEE (Institute of Electrical and Electronics Engineers) 802.11 is developed as standards for wireless LAN technology. IEEE 802.11a and 11b use unlicensed bands, IEEE 802.11b provides a transmission speed of 11 Mbps and IEEE 802.11a provides a transmission speed of 54 Mbps. IEEE 802.11g provides a transmission speed of 54 Mbps using orthogonal frequency-division multiplexing (OFDM) at 2.4 GHz. IEEE 802.11n provides a transmission speed of 300 Mbps for four spatial streams using multiple input multiple output-OFDM (MIMO-OFDM). IEEE 802.11n supports up to 40 MHz channel bandwidth. In this case, a transmission speed of 600 Mbps is provided.

The aforementioned wireless LAN standards use a maximum bandwidth of 160 MHz, and IEEE 802.11ax standardization developed from IEEE 802.11ac which supports eight spatial streams to support up to 1 Gbit/s is under discussion.

SUMMARY

One object of the present disclosure is to provide a WUR duty cycle mode operation method which is more efficient for power reduction of an STA and a device therefor.

The present specification is not limited to the aforementioned technical task and other technical tasks can be inferred from embodiments of the present disclosure.

In one aspect to accomplish the aforementioned object, a method for receiving a wake-up radio (WUR) frame by a station (STA) in a wireless LAN (WLAN) includes: entering a WUR duty cycle mode in which an on-duration in which a WUR receiver of the STA is awake and an off-duration in which the WUR receiver is asleep are alternately repeated; and turning on primary connectivity radio (PCR) when a WUR frame is detected in an on-duration of the WUR duty cycle mode, wherein, when the WUR frame indicates reception of a PCR beacon frame or a delivery traffic indication map (DTIM), the STA may delay a predetermined time from detection of the WUR frame and then turn on the PCR based on a time at which the PCR beacon frame or the DTIM is transmitted.

In another aspect to accomplish the aforementioned object, a station (STA) receiving a WUR frame includes: a WUR receiver; and a processor configured to enter a WUR duty cycle mode in which an on-duration in which a WUR receiver of the STA is awake and an off-duration in which the WUR receiver is asleep are alternately repeated and to turn on primary connectivity radio (PCR) when a WUR frame is detected in an on-duration of the WUR duty cycle mode, wherein, when the WUR frame indicates reception of a PCR beacon frame or a delivery traffic indication map (DTIM), the processor may delay a predetermined time from detection of the WUR frame and then turn on the PCR based on a time at which the PCR beacon frame or the DTIM is transmitted.

The STA may determine delay of the predetermined time such that the PCR is turned on at the time at which the PCR beacon frame or the DTIM is transmitted.

When the WUR frame indicates reception of unicast data, the STA may immediately turn on the PCR upon detection of the WUR frame.

The STA may receive the PCR beacon frame from an access point (AP) to update system information when the WUR frame indicates reception of the PCR beacon frame. The STA may immediately return to the WUR duty cycle mode when system information update is completed without receiving an instruction from the AP.

The STA may receive the DTIM from an access point (AP) when the WUR frame indicates reception of the DTIM and receive a group addressed bufferable unit (BU) based on the DTIM.

The STA may immediately return to the WUR duty cycle mode when reception of the group addressed BU is completed without receiving an instruction from the AP.

The WUR frame may be a broadcast WUR frame or a WUR beacon frame

The WUR frame may include indicator information for indicating reception of the PCR beacon frame, the DTIM or the unicast data. The indicator information may correspond to a type field or a wake-up indication field of the WUR frame.

According to an embodiment of the present disclosure, it is possible to solve a problem of waste of power occurring when an STA operating in a WUR duty cycle mode immediately wakes up after detection of a WUR frame in an on-duration and waits for a long time until a PCR frame is received.

Technical effects other than the aforementioned technical effect can be inferred from embodiment of the present disclosure.

BRIEF DESCRIPTION OF THE DRAWINGS

FIG. 21 shows a wake-up frame format including a wake-up reason field according to an embodiment of the present disclosure.

FIG. 24 shows a WUR beacon frame format including a wake-up indicator field according to an embodiment of the present disclosure.

DESCRIPTION OF EXEMPLARY EMBODIMENTS

Hereinafter, preferred embodiments of the present disclosure will be described in detail with reference to the attached drawings. The detailed description, which will be given below with reference to the accompanying drawings, is intended to explain exemplary embodiments of the present disclosure, rather than to show the only embodiments that can be implemented according to the present disclosure.

While the following detailed description includes specific details in order to provide a thorough understanding of the present disclosure, it will be apparent to those skilled in the art that the present disclosure may be practiced without such specific details. In some instances, known structures and devices are omitted, or are shown in a block diagram form focusing on important features of the structures and devices, so as not to obscure the concept of the present disclosure.

As described above, a method for efficiently using a channel having a wide bandwidth in a wireless LAN system and a device therefor will be described below. For this, a wireless LAN system to which the present disclosure is applied will be described in detail first.

Figure 1:
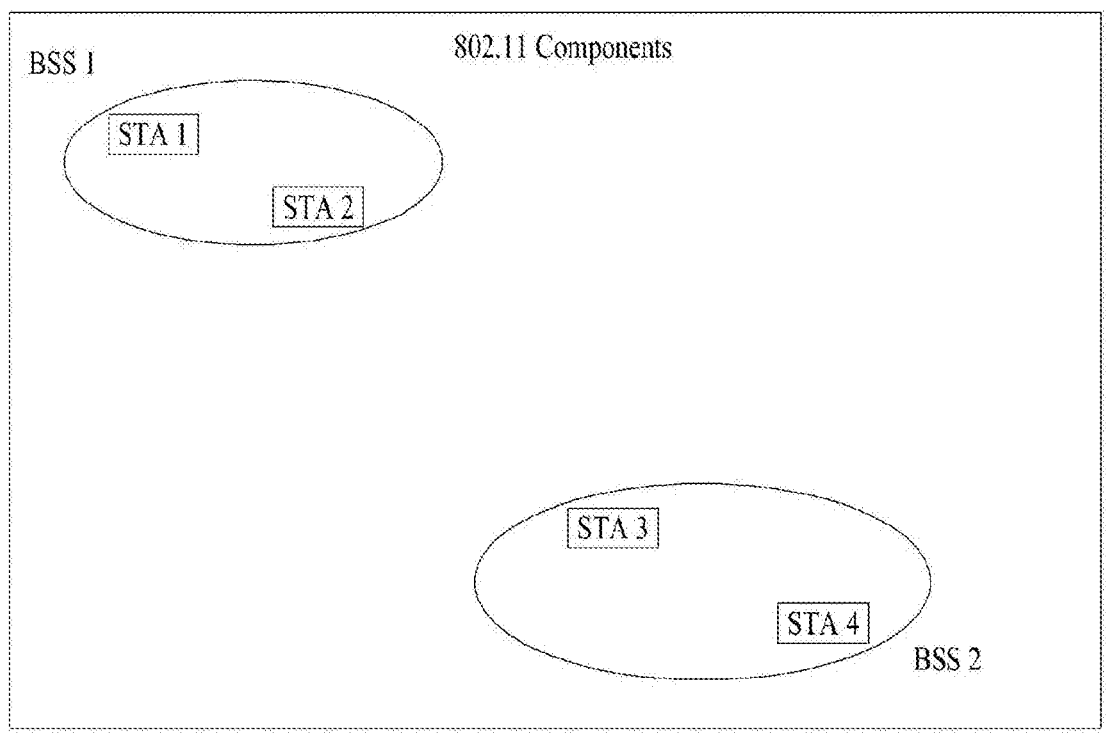
FIG. 1 is a diagram showing an example of a configuration of a wireless LAN system.

FIG. 1 is a diagram showing an example of a configuration of a wireless LAN system.

As illustrated in FIG. 1, the wireless LAN system includes at least one Basic Service Set (BSS). The BSS is a set of stations (STAs) that are able to communicate with each other by successfully performing synchronization.

An STA is a logical entity including a physical layer interface between a Media Access Control (MAC) layer and a wireless medium, and the STA includes an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
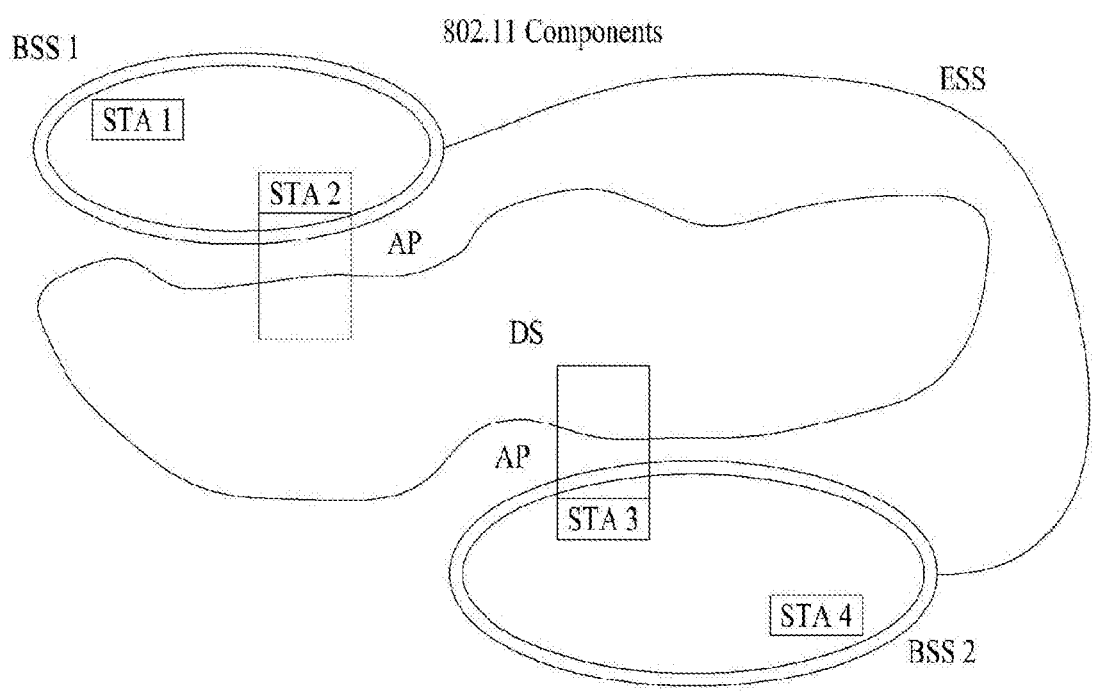
FIG. 2 is a diagram showing another example of a configuration of a wireless LAN system.

FIG. 2 is a diagram illustrating another example of a configuration of a wireless LAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Structure

The operation of an STA operating in a wireless LAN system can be described in terms of a layer structure. The layer structure can be implemented by a processor in terms of device configuration. An STA may have a multi-layer structure. For example, a MAC sublayer and a physical layer (PHY) on a data link layer (DLL) are mainly handled in 802.11. The PHY may include a PLCP (Physical Layer Convergence Procedure) entity, a PMD (Physical Medium Dependent) entity, and the like. The MAC sublayer and PHY conceptually include management entities called an MLME (MAC sublayer Management Entity) and a PLME (Physical Layer Management Entity), respectively. These entities provide a layer management service interface that executes a layer management function.

In order to provide correct MAC operation, an SME (Station Management Entity is present within each STA. The SME is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs) and similarly setting the value of layer-specific parameters. The SME may typically perform such functions on behalf of general system management entities and implement standard management protocols.

The aforementioned entities interact in various ways. For example, entities can interact by exchanging GET/SET primitives. A primitive refers to a set of elements or parameters related to a specific purpose. XX-GET.request primitive is used to request the value of a given MIB attribute (management information based attribute information). XX-GET.confirm primitive is used to return an appropriate MIB attribute value if status="success," otherwise return an error indication in the Status field. XX-SET.request primitive is used to request that an indicated MIB attribute be set to a given value. If this MIB attribute implies a specific action, then this requests that the action be performed. XX-SET.confirm primitive is used such that, if status="success," this confirms that the indicated MIB attribute was set to the requested value, otherwise it returns an error condition in Status field. If this MIB attribute implies a specific action, then this confirms that the action was performed.

Also, various MLME_GET/SET primitives may be exchanged between MLME and SME via MLME SAP (Service Access Point). Further, various PLME GET/SET primitives may be exchanged between PLME and SME via PLME_SAP and between MLME and PLME via MLME-PLME_SAP.

Link Setup Process

Figure 3:
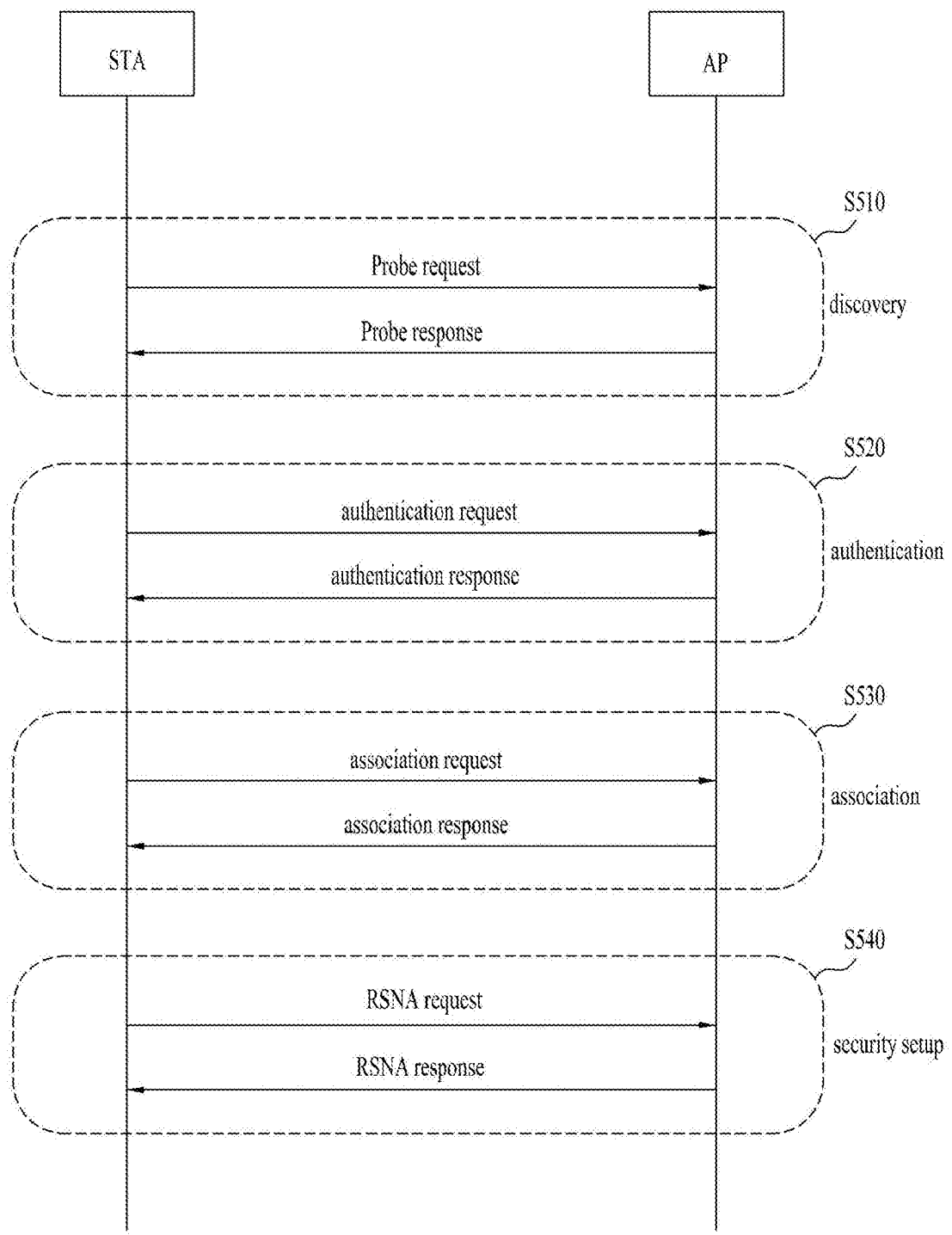
FIG. 3 is a diagram illustrating a general link setup process.

FIG. 3 is a diagram illustrating a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S510. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S520. This authentication process may be referred to as a first authentication process to be clearly distinguished from a security setup process of step S540 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, an RSN (Robust Security Network), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA based on information included in the received authentication request frame. The AP may provide an authentication processing result to the STA through the authentication response frame.

After successful authentication of the STA, the association process may be performed in step S530. The association process includes a process in which the STA transmits an association request frame to the AP and the AP transmits an association response frame in response thereto to the STA.

For example, the association request frame may include information related to various capabilities and information about a beacon listen interval, an SSID (service set identifier), supported rates, supported channels, an RSN, mobile domains, supported operating classes, a traffic indication map (TIM) broadcast request, interworking service capability, and the like.

For example, the association response frame may include information related to various capabilities and information about status code, an AID (Association ID), supported rates, an EDCA (Enhanced Distributed Channel Access) parameter set, an RCPI (Received Channel Power Indicator), an RSNI (Received Signal to Noise Indicator), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S540. The security setup process of step S540 may also be referred to an authentication process through an RSNA (Robust Security Network Association) request/response, the authentication process of step S520 may also be referred to as a first authentication process and the security setup process of step S540 may also be simply referred to as an authentication process.

The security setup process of step S540 may include a private key setup process through 4-way handshaking using an EAPOL (Extensible Authentication Protocol over LAN) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 4:
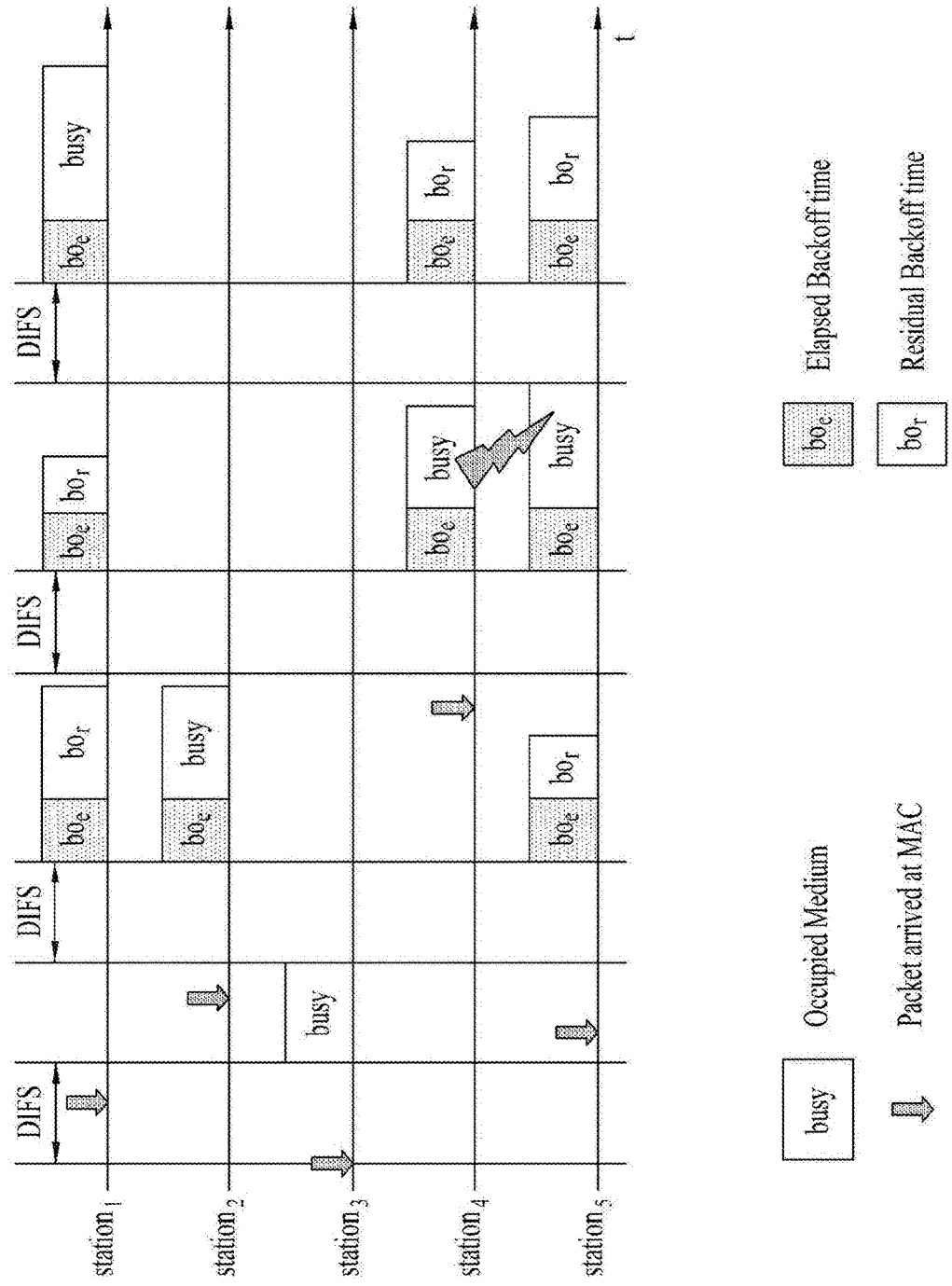
FIG. 4 is a diagram illustrating a backoff process.

FIG. 4 is a diagram illustrating a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to 2n−1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, assume that the transmission range may be equal to the actual carrier sensing range.

Figure 5:
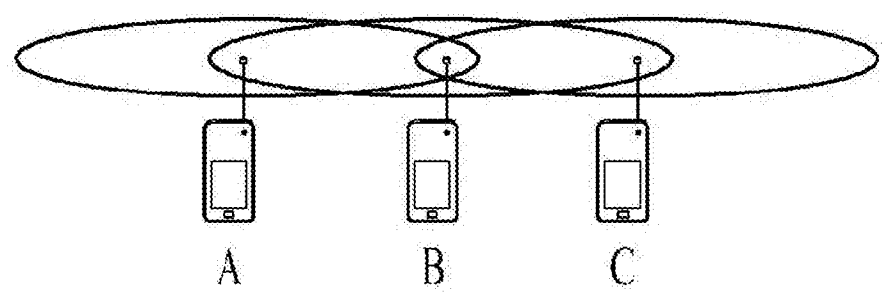
FIG. 5 is a diagram illustrating a hidden node and an exposed node.
Figure 5:
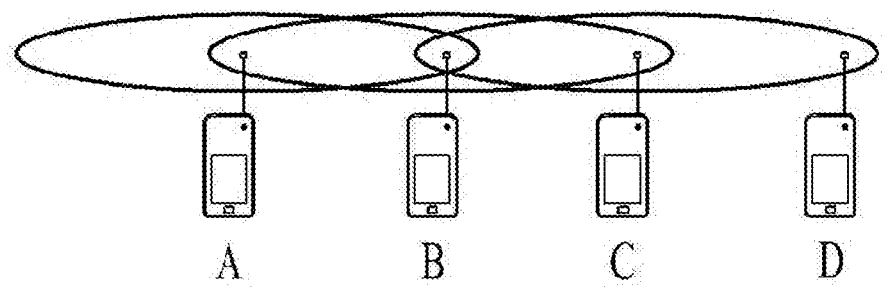

FIG. 5 is a diagram illustrating a hidden node and an exposed node.

FIG. 5(a) shows a hidden node, and, in this case, an STA A and an STA B are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STA B. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be an exposed node of the STA B.

Figure 7:
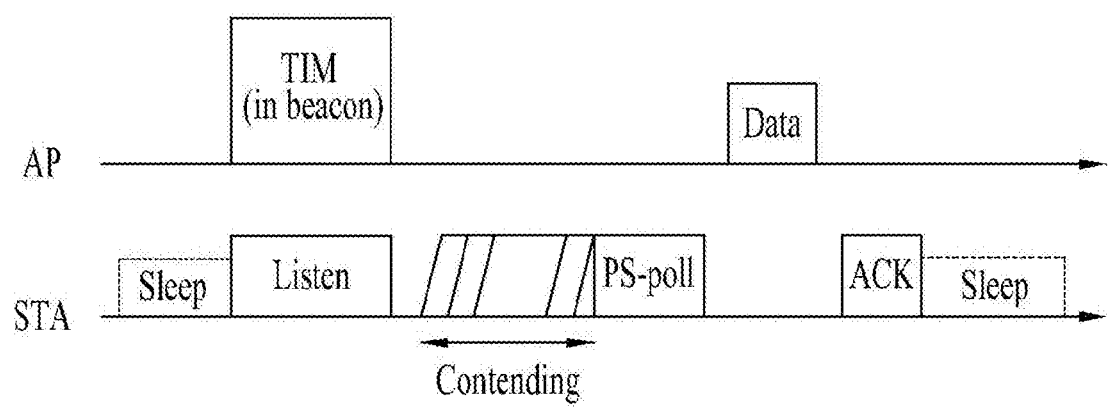
FIGS. 7 to 9 are diagrams illustrating an operation of an STA which receives a TIM.

FIG. 7 is a diagram illustrating RTS and CTS.

In the example of FIG. 5, in order to efficiently use a collision avoidance mechanism, short signaling packet such as RTS (request to send) and CTS (clear to send) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

Figure 6:
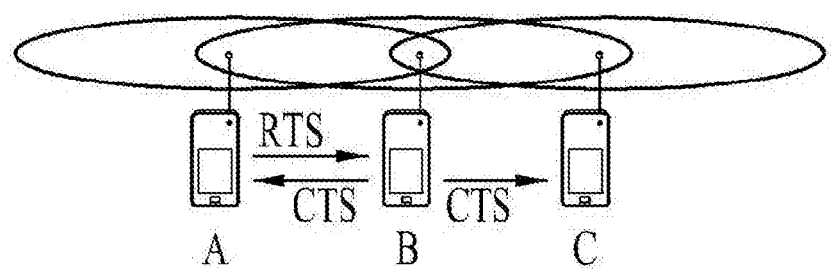
FIG. 6 is a diagram illustrating an RTS and a CTS.
Figure 6:
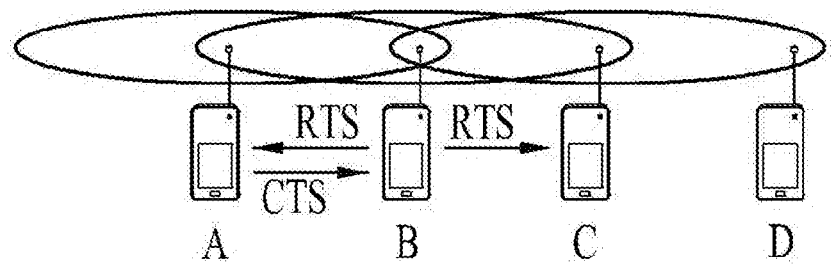

FIG. 6(a) shows a method for solving a hidden node problem. Assume that both the STA A and the STA C attempt to transmit data to the STA B. If the STA A transmits the RTS to the STA B, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs associated with the AP 210 is present and the AP will transmit a frame. The TIM element includes a TIM used to indicate a unicast frame or a delivery traffic indication map (DTIM) used to indicate a multicast or broadcast frame.

Figure 8:
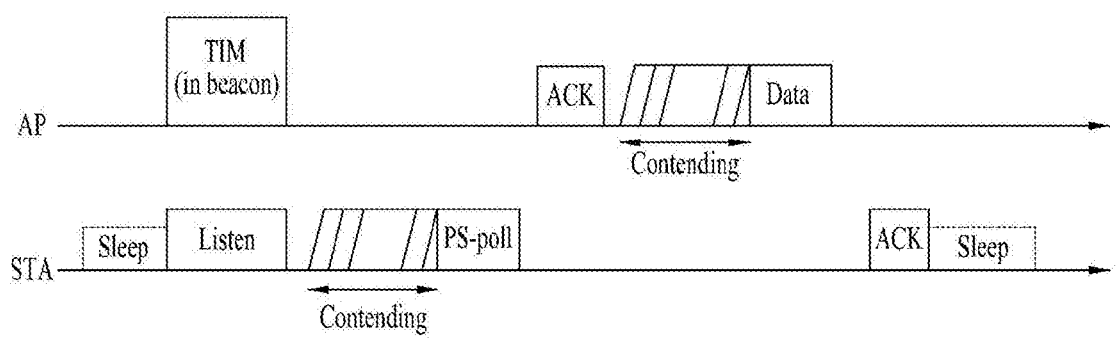
Figure 9:
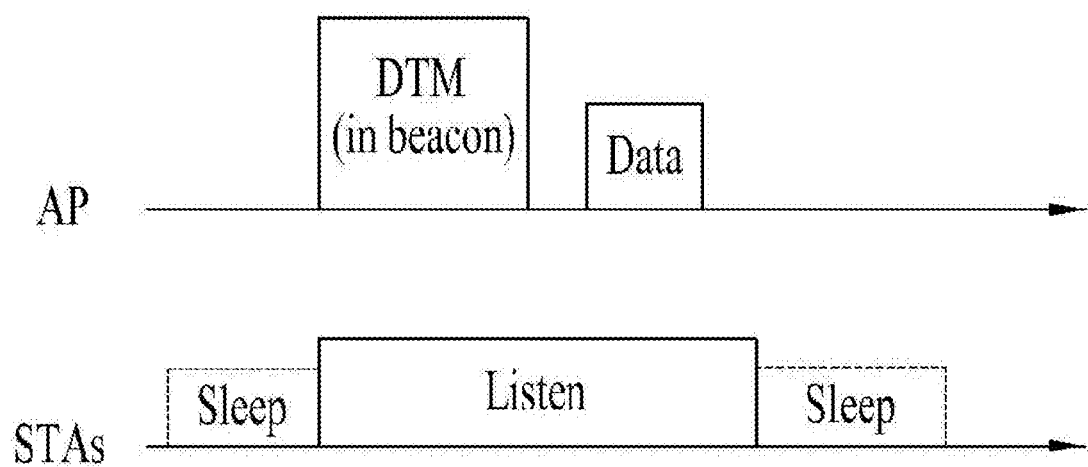

FIGS. 7 to 9 are diagrams illustrating an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)).

If the AP does not prepare a data frame to be transmitted to the STA during the SIFS after receiving the PS-Poll frame, the AP may operate according to a deferred response method, which will be described with reference to FIG. 8.

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
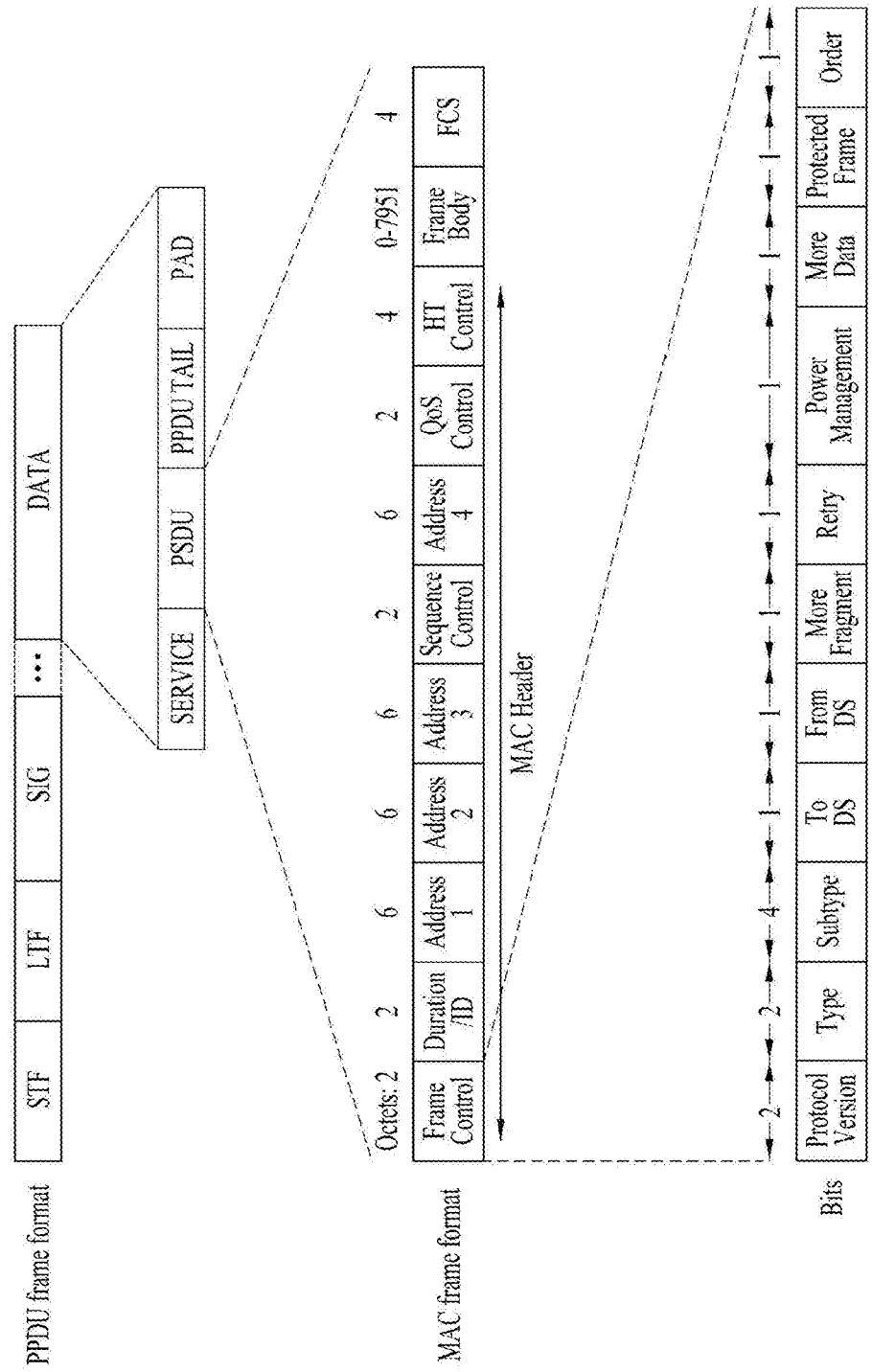
FIG. 10 is a diagram illustrating an example of a frame structure used in an IEEE 802.11 system.

FIG. 10 is a diagram illustrating an example of a frame structure used in IEEE 802.11.

A physical layer protocol data unit (PPDU) frame format may include a short training field (STF), a long training field (LTF), a signal (SIG) field and a data field. The most basic (e.g., non-HT (High Throughput)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type. For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (μs). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Refer to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard document for details of the subfields of the frame control field.

WUR (Wake-Up Radio)

First, a wake-up radio receiver (WURx) compatible with a WLAN system (e.g., 802.11) will be described with reference to FIG. 11.

Figure 11:
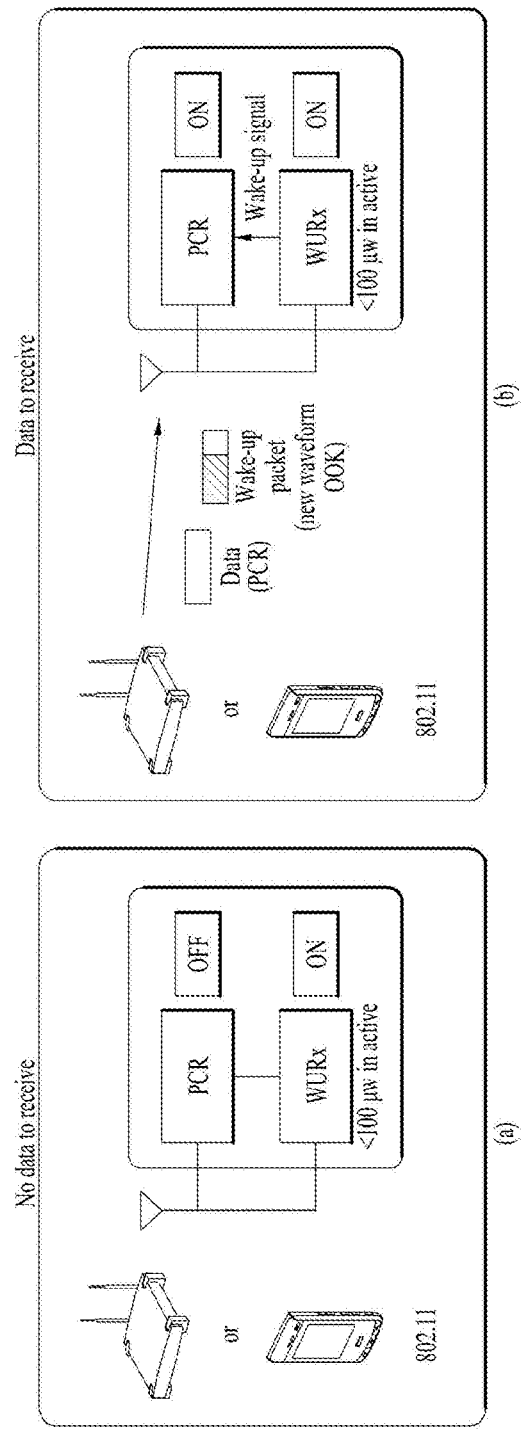
FIG. 11 is a diagram illustrating a WUR receiver that can be used in a wireless LAN system (e.g., 802.11).

Referring to FIG. 11, an STA may support primary connectivity radio (PCR) (e.g., IEEE 802.11a/b/g/n/ac/ax WLAN) and wake-up radio (WUR) (e.g., IEEE 802.11ba) for main wireless communication.

The PCR is used for data transmission and reception and may be turned off if there is no data to be transmitted/received. When the PCR is turned off, the WURx of the STA may wake up the PCR if there is a packet to be received. Accordingly, user data is transmitted and received through the PCR.

The WURx is not used for user data and may serve to wake a PCR transceiver up. The WURx may be a simple receiver that does not have a transmitter and is enabled while the PCR is turned off. It is desirable that target power consumption of the WURx do not exceed 100 microwatt (μW) in an enabled state. For such low-power operation, a simple modulation method, for example, on-off keying (OOK) may be used and a narrow bandwidth (e.g., 4 MHz or 5 MHz) may be used. A target reception range (e.g., distance) of the WURx may correspond to the current standard of IEEE 802.11.

Figure 12:
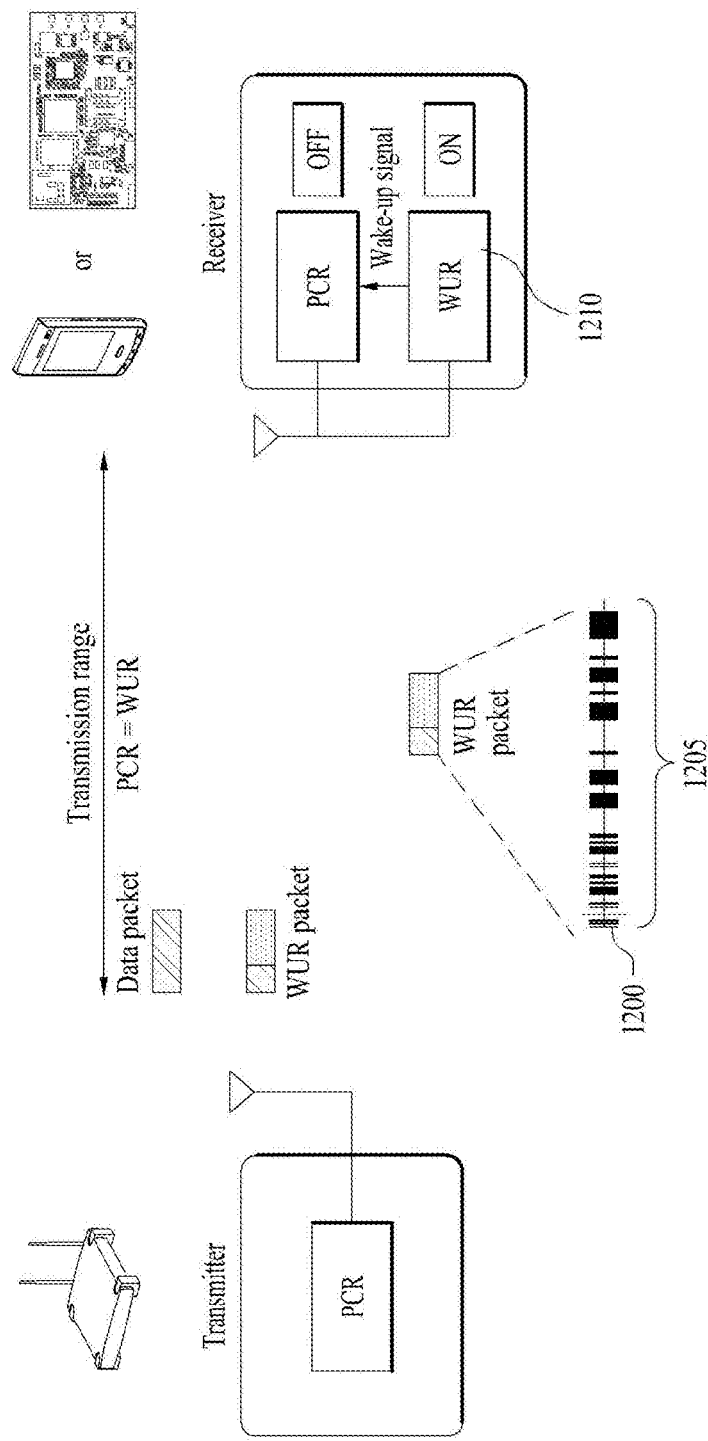
FIG. 12 is a diagram illustrating a WUR receiver operation.

FIG. 12 is a diagram illustrating a design and operation of a WUR packet.

Referring to FIG. 12, the WUR packet may include a PCR part 1200 and a WUR part 1205.

The PCR part 1200 is for coexistence with legacy WLAN systems and may also be referred to as a WLAN preamble. In order to protect the WUR packet from other PCR STAs, at least one of L-STF, L-LTF and L-SIG of a legacy WLAN may be included in the PCR part 1200. Accordingly, a 3rd party legacy STA can ascertain that the WUR packet is not intended therefor and a PCR medium has been occupied by another STA through the PCR part 1200 of the WUR packet. However, WURx does not decode the PCR part of the WUR packet because WURx which supports narrow bands and OOK demodulation does not support PCR signal reception.

At least a part of the WUR part 1205 may be a part modulated based on OOK. For example, the WUR part may include at least one of a WUR preamble, a MAC header (e.g., receiver address or the like), a frame body and a frame check sequence (FCS). OOK modulation may be performed by modifying an OFDM transmitter.

A WURx 1210 consumes very low power of 100 µW or less, as described above, and may be implemented as a small and simple OOK demodulator.

Since the WUR packet needs to be designed to be compatible in WLAN systems as described above, the WUR packet may include the preamble (e.g., OFDM) of the legacy WLAN and new LP-WUR signal waveforms (e.g., OOK).

Figure 13:
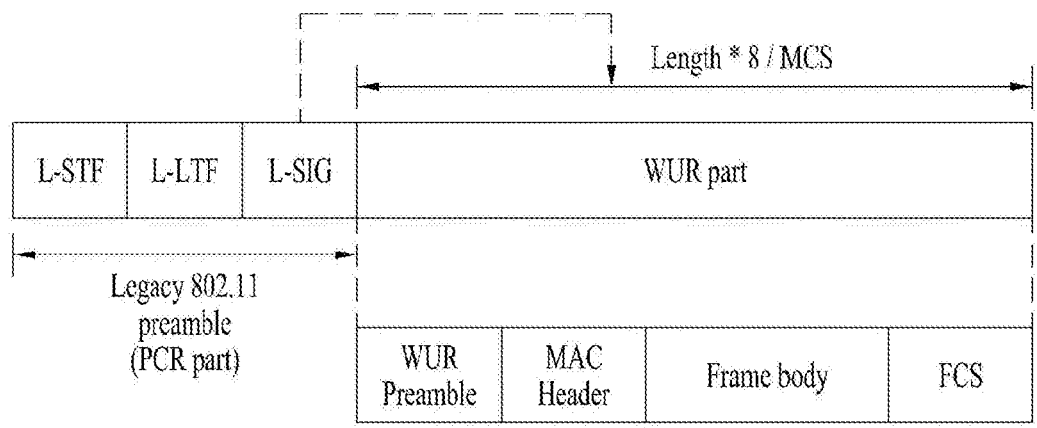
FIG. 13 illustrates an exemplary WUR packet.

FIG. 13 illustrates an exemplary WUR packet. The WUR packet of FIG. 13 includes a PCR part (e.g., legacy WLAN preamble) for coexistence with legacy STAs.

Referring to FIG. 13, the legacy WLAN preamble may include L-STF, L-LTF and L-SIG. In addition, a WLAN STA (e.g., 3rd party STA) may ascertain the end of the WUR packet through L-SIG. For example, the L-SIG field may indicate the length of a payload (OOK-modulated, for example) of the WUR packet.

A WUR part may include at least one of a WUR preamble, a MAC header, a frame body and an FCS. The WUR preamble may include a PN sequence, for example. The MAC header may include a receiver address. The frame body may include information necessary for wake-up. The FCS may include a cyclic redundancy check (CRC).

Figure 14:
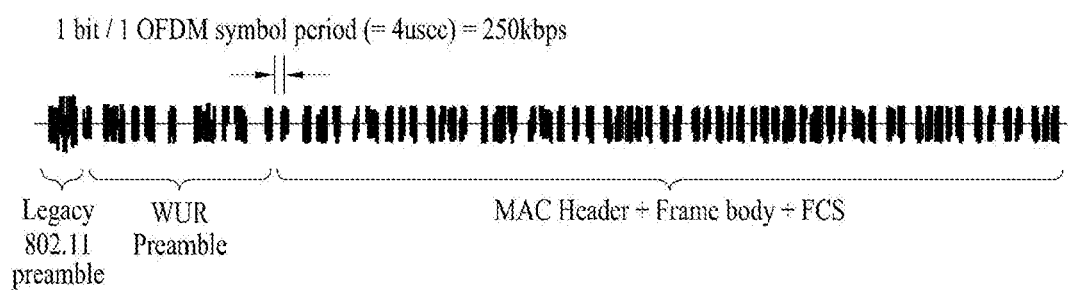
FIG. 14 illustrates waveforms of a WUR packet.

FIG. 14 illustrates waveforms of the WUR packet of FIG. 13. Referring to FIG. 14, 1 bit per OFDM symbol length (e.g., 4 µsec) may be transmitted in an OOK-modulated WUR part. Accordingly, the data rate of the WUR part may be 250 kbps.

Figure 15:
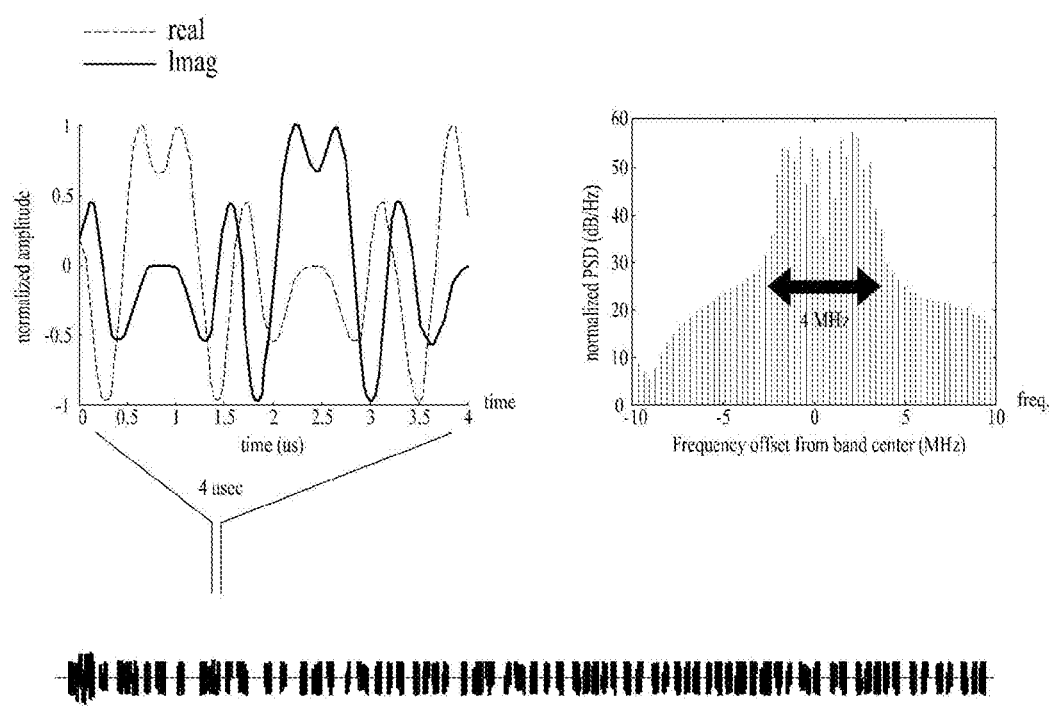
FIG. 15 is a diagram illustrating a WUR packet generated using an OFDM transmitter of a wireless LAN.

FIG. 15 is a diagram illustrating generation of a WUR packet using an OFDM transmitter of a WLAN. While the phase shift keying (PSK)-OFDM transmission technique is used in the WLAN, generation of a WUR packet through an additional OOK modulator for modulation causes increase in transmitter implementation costs. Accordingly, a method for generating an OOK-modulated WUR packet by reusing an OFDM transmitter is described.

According to OOK modulation, a bit value 1 is modulated into a symbol (i.e., on) having arbitrary power loaded therein or power equal to or greater than a threshold value and a bit value 0 is modulated into a symbol (i.e., off) having no power loaded therein or power less than the threshold value. The bit value 1 may be defined as power off.

In such an OOK modulation method, the bit value 1/0 is indicated through power on/off at the corresponding symbol position. These simple OOK modulation/demodulation methods have the advantage of reducing power consumed for signal detection/demodulation of a receiver and costs for realizing the same. Further, OOK modulation of turning on/off a signal may be performed by reusing a legacy OFDM transmitter.

The left graph of FIG. 15 shows the real part and the imaginary part of a normalized amplitude for 1 symbol period (e.g., 4 µsec) with respect to a bit value 1 which is OOK-modulated by reusing an OFDM transmitter of a legacy WLAN. An OOK modulation result for a bit value 0 corresponds to power off and thus illustration thereof is omitted.

The right graph of FIG. 15 shows normalized power spectral density (PSD) on the frequency domain with respect to a bit value 1 which is OOK-modulated by reusing an OFDM transmitter of the legacy WLAN. For example, the center frequency 4 MHz in the corresponding band may be used for WUR. Although it is assumed that WUR operates with a bandwidth of 4 MHz in FIG. 15, it is for the purpose of convenience of description and other frequency bandwidths may be used. However, it is desirable that WUR operates with a narrower bandwidth than the operation bandwidth of PCR (e.g., legacy WLAN) for power saving.

In FIG. 15, it is assumed that a subcarrier spacing is 312.5 kHz and an OOK pulse bandwidth corresponds to 13 subcarriers. The 13 subcarriers correspond to approximately 4 MHz (i.e., 4.06 MHz=13*312.5 kHz) as described above.

When an input sequence of inverse fast Fourier transform (IFFT) is defined as s={13 subcarrier tone sequence} in a legacy OFDM transmitter, IFFT for the sequence s is performed such that $X_t$=IFFT(s), and then a cyclic prefix (CP) having a length of 0.8 µsec is attached thereto, a symbol length of approximately 4 µs is obtained.

The WUR packet may also be referred to as a WUR signal, a WUR frame or a WUR PPDU. The WUR packet may be a packet (e.g., WUR beacon) for broadcast/multicast or a packet (e.g., packet for ending a WUR mode of a specific WUR STA and waking up the specific WUR STA) for unicast.

Figure 16:
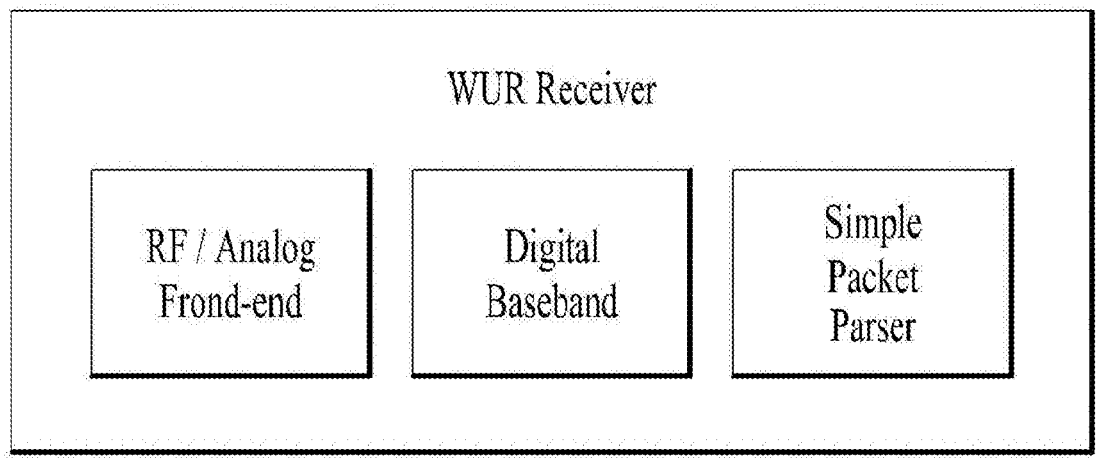
FIG. 16 illustrates a structure of a WUR receiver.

FIG. 16 illustrates a structure of a WUR receiver (WURx). Referring to FIG. 16, the WURx may include an RF/analog front-end, a digital baseband processor and a simple packet parser. FIG. 16 illustrates an exemplary configuration and the WUR receiver of the present disclosure is not limited to FIG. 16.

Hereinafter, a WLAN STA having the WUR receiver is simply referred to as a WUR STA. The WUR STA may also be simply referred to as an STA.

OOK Modulation with Manchester Coding

According to an embodiment of the present disclosure, Manchester coding may be used for OOK symbol generation. According to Manchester coding, 1-bit information is indicated by two pieces of sub information (or two coded bits). For example, when 1-bit information "0" is subjected to Manchester coding, two sub information bits "10" (i.e., on-off) are output. When 1-bit information "1" is subjected to Manchester coding, two sub information bits "01" (i.e., off-on) are output. However, the on-off order of sub information bits may be reversed according to an embodiment.

A method for generating 1 OOK symbol based on Manchester coding will be described. Although it is assumed that 1 OOK symbol is 3.2 µs in the time domain and corresponds to K subcarriers in the frequency domain for convenience of description, the present disclosure is not limited thereto.

First, a method for generating an OOK symbol for 1-bit information "0" based on Manchester coding is described. 1 OOK symbol length may be divided into (i) 1.6 µs for the first sub information bit "1" and (ii) 1.6 µs for the second sub information bit "0".

(i) The signal corresponding to the first sub information bit "1" may be obtained by mapping β to odd-numbered subcarriers from among the K subcarriers, mapping 0 to even-numbered subcarriers and then performing IFFT. For example, when β is mapped to subcarriers at an interval of two subcarriers and IFFT is performed in the frequency domain, periodic signals of 1.6 μs appears twice in the time domain. First or second signal of the periodic signals of 1.6 μs repeated twice may be used as the signal corresponding to the first sub information bit "1". β is a power normalization factor and may be 1/sqrt(ceil(K/2)), for example. For example, the K consecutive subcarriers used to generate the signal corresponding to the first sub information bit "1" from among a total of 64 subcarriers (i.e., 20 MHz) may be represented as [33−floor(K/2): 33+ceil(K/2)−1].

(ii) The signal corresponding to the second sub information bit "0" may be obtained by mapping 0 to K subcarriers and then performing IFFT. For example, the K consecutive subcarriers used to generate the signal corresponding to the second sub information bit "0" from among the 64 subcarriers (i.e., 20 MHz) may be represented as [33−floor(K/2): 33+ceil(K/2)−1].

The OOK symbol for 1-bit information "1" may be obtained by arranging the signal corresponding to the sub information bit "1" after the signal corresponding to the sub information bit "0".

Symbol Reduction

For example, 1 symbol length for WUR may be set to be less than 3.2 μs. For example, 1 symbol may be set to 1.6 μs, 0.8 μs or information of 0.4 μs+CP.

(i) 0.8 μs, information bit 1: β (e.g., power normalization factor)*1 may be mapped to subcarriers (i.e., 1, 5, 9, . . . ) that satisfy mod(subcarrier index, 4)=1 from among K consecutive subcarriers and nulling may be applied (e.g., 0 may be mapped) to the remaining subcarriers. β may be 1/sqrt(ceil(K/4)). In this manner, β*1 may be mapped at an interval of 4 subcarriers. When β*1 is mapped at an interval of 4 subcarriers and IFFT is performed on the frequency domain, signals having a length of 0.8 us are repeated in the time domain, and one of these signals may be used as the signal corresponding to the information bit 1.

(ii) 0.8 μs, information bit 0: Time domain signals may be obtained by mapping 0 to K subcarriers and performing IFFT, and one of the obtained signals which has a length of 0.8 μs may be used.

(iii) 0.4 μs, information bit 1: β (e.g., power normalization factor)*1 may be mapped to subcarriers (i.e., 1, 9, 17 . . . ) that satisfy mod(subcarrier index, 8)=1 from among K consecutive subcarriers and nulling may be applied (e.g., 0 may be mapped) to the remaining subcarriers. β may be 1/sqrt(ceil(K/8)). In this manner, β*1 may be mapped at an interval of 8 subcarriers. When β*1 is mapped at an interval of 8 subcarriers and IFFT is performed on the frequency domain, signals having a length of 0.4 μs are repeated in the time domain, and one of these signals may be used as the signal corresponding to the information bit 1.

(iv) 0.4 μs, information bit 0: Time domain signals may be obtained by mapping 0 to K subcarriers and performing IFFT, and one of the obtained signals which has a length of 0.4 μs may be used.

Power Saving Operation in WUR Duty Cycle Mode

A method for transmitting a wake-up packet to an STA in a WUR duty cycle mode will be described. A beacon mentioned in the description below may refer to a PCR beacon unless it is limited to a WUR beacon.

A WUR STA operating in the WUR duty cycle mode immediately turns on PCR to switch to an awake state upon reception of a WUR frame. This WUR STA operation may cause unnecessary power consumption.

Scenario 1: An AP may allow WUR STAs to receive a PCR beacon and update system information included in the PCR beacon. To this end, the AP may transmit a WUR frame and a WUR STA turns on PCR and wait to receive a PCR beacon upon reception of the WUR frame. STAs in the duty cycle mode wake up in on-durations thereof and wait to receive a WUR frame. However, if a PCR beacon is not immediately transmitted after an STA wakes up, the STA needs to be in an awake state until the PCR beacon is transmitted, causing unnecessary power consumption.

Figure 17:
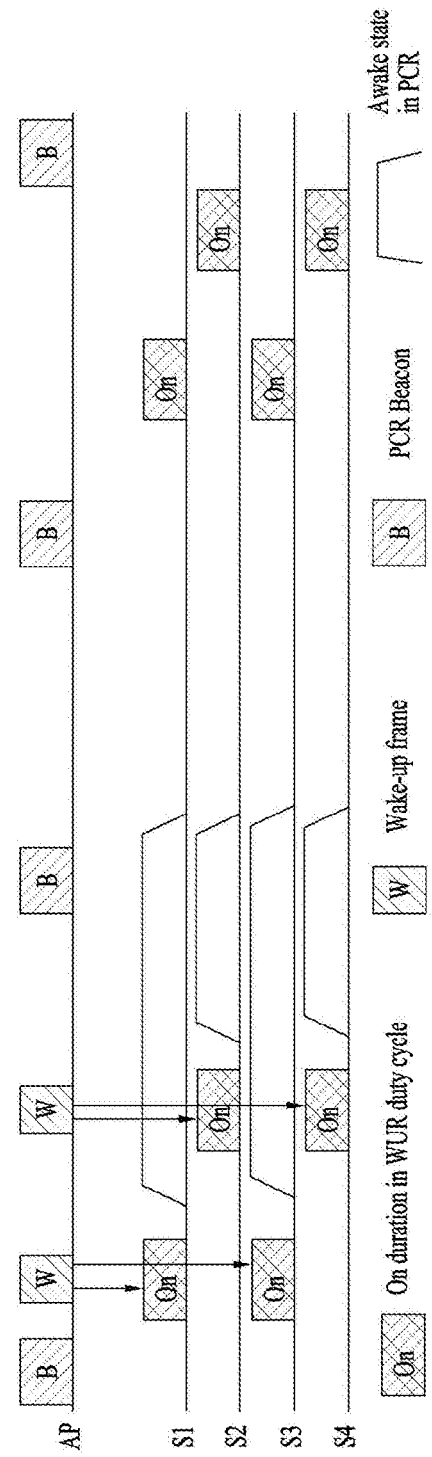
FIGS. 17 and 18 are diagrams illustrating problems with respect to waste of power of WUR STAB.

FIG. 17 is a diagram illustrating a problem with respect to power consumption of WUR STAs in scenario 1. Referring to FIG. 17, STA1 (S1) and STA3 (S3) have the same duty cycle information (e.g., on-duration, off-duration, period, etc.) and STA2 (S2) and STA4 (S4) have the same duty cycle information. S1 to S4 receive a wake-up frame (e.g., broadcast wake-up frame) in on-durations thereof, turn on PCR and then wait to receive a PCR beacon in an awake state. Since the PCR beacon is transmitted after a long time from wake-up, the STAs unnecessarily waste power until the PCR beacon is received.

Scenario 2: An AP may allow WUR STAs to receive group address BU (e.g., broadcast/multicast data) on PCR. According to the current WLAN scheme, STAs need to receive a DTIM beacon on PCR first in order to receive the group address BU, and thus the AP can transmit a wake-up frame. STAs in the duty cycle mode wake up in on-durations thereof, receive the WUR frame (/wake-up frame), turn on PCR and wait to receive a frame from the AP. However, if a PCR beacon including DTIM is not immediately transmitted after an STA wakes up, the STA needs to be in the awake state until a DTIM beacon is transmitted. This causes unnecessary power consumption.

Figure 18:
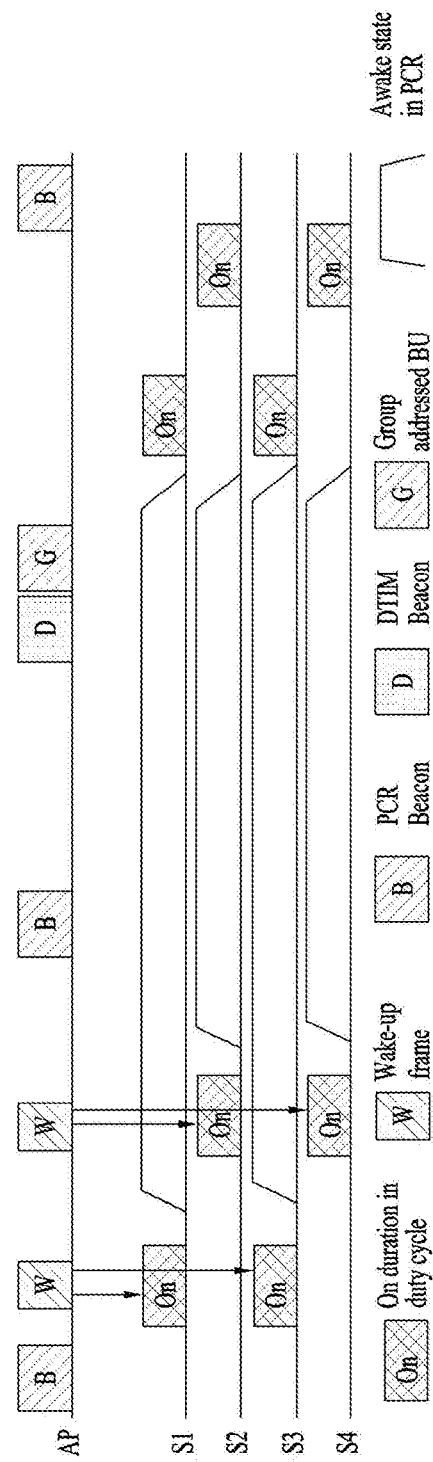

FIG. 18 is a diagram illustrating a problem with respect to power consumption of WUR STAs in scenario 2.

In the example of FIG. 18, STA1 (S1) and STA3 (S3) have the same duty cycle information (e.g., on-duration, off-duration, period, etc.) and STA2 (S2) and STA4 (S4) have the same duty cycle information. S1 to S4 receive a wake-up frame (e.g., broadcast wake-up frame) in on-durations thereof, turn on PCR and then wait to receive a DTIM beacon from an AP in an awake state. Since the DTIM beacon is transmitted after a long time from wake-up, the STAs unnecessarily waste power until the DTIM beacon is received.

In addition, in FIG. 18, the STAs cannot determine whether to wake up, receive a PCR beacon and immediately enter the WUR mode after reception of the broadcast wake-up frame or to additionally receive a DTIM and a group addressed BU (bufferable unit) and enter the WUR mode.

To solve the problems in scenarios 1/2, when the AP transmits a wake-up frame (e.g., broadcast wake-up frame, description will be given using the broadcast wake-up frame (broadcast WUF) for convenience), the AP includes information for updating system parameters (e.g., a next beacon reception indicator, etc.) in the wake-up frame and transmits the wake-up frame including the information. When a WUR STA receives the broadcast WUF including information indicating next beacon reception, the WUF is regarded as a WUF transmitted for PCR beacon reception and a wake-up procedure (i.e., operation of turning on PCR) is completed until the next PCR beacon transmission time (e.g., next TBTT). That is, the STA completes turning on of PCR until TBTT. Accordingly, STAs can delay a wake-up procedure start time depending on TBTT and thus can reduce unnecessary power consumption. Alternatively, an STA which has received a wake-up frame including information indicating system parameter update turns on PCR, enters a doze state before PCR (e.g., Wi-Fi) beacon transmission time (e.g., next TBTT), switches to an awake state at the next TBTT and receive a PCR beacon to perform system parameter update.

Figure 19:
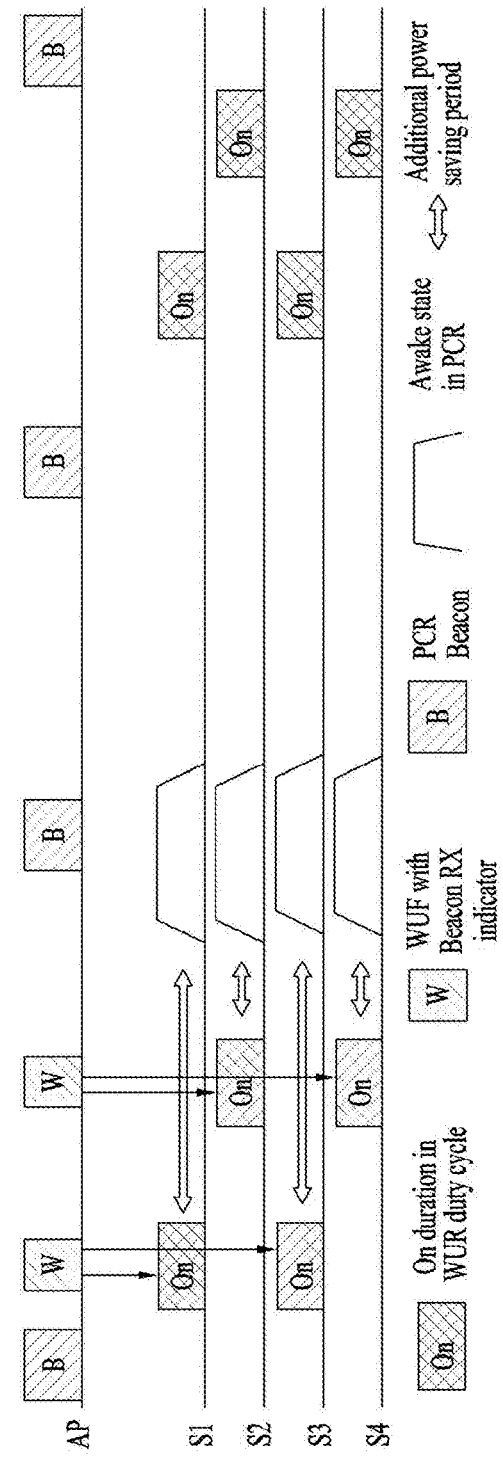
FIG. 19 is a diagram illustrating an STA operation according to a wake-up frame (WUF) including a next beacon reception indicator according to an embodiment of the present disclosure.

FIG. 19 is a diagram illustrating an STA operation according to a wake-up frame (WUF) including the next beacon reception indicator for system parameter update according to an embodiment of the present disclosure.

In FIG. 19, if an AP attempts to transmit a WUF for PCR beacon reception for system parameter update of an STA, the AP includes information for system parameter update (e.g., next beacon reception indication information, etc.) in the WUF (e.g., broadcast wakeup frame) and transmits the WUF including the information. An STA operating in the duty cycle mode receives the WUF in an on-duration thereof. STA1 to STA4 receive the WUF in on-durations thereof. Since the WUF includes the next beacon reception indication information, the STAs regard the WUF as a WUF for PCR beacon reception and complete a PCR on procedure at a PCR beacon transmission time to reduce unnecessary power consumption. That is, the STAs can delay a PCR on start time. Alternatively, an STA which has received a wake-up frame including information indicating system parameter update turns on PCR, enters a doze state before a PCR (e.g., Wi-Fi) beacon transmission time (e.g., next TBTT), switches to an awake state at the next TBTT and receives a PCR beacon to perform system parameter update.

In FIG. 19, an additional power saving period is a period in which unnecessary power consumption of STAs can be reduced as compared to a conventional procedure.

STAs which have received the wake-up frame or broadcast wake-up frame including information indicating that the STAs need to wake up for PCR beacon reception may correctly receive a PCR beacon at a beacon transmission time and update system parameters. After system parameter update, the STAs may immediately enter a WUR mode without transmitting any signaling or frame to the AP. In this case, PCR of the STAs enters the doze state and thus can further reduce unnecessary power consumption. Accordingly, unnecessary power consumption of STAs having WURx, such as sensor devices, can be minimized.

If the broadcast wake-up frame indicates PCR beacon reception, an STA may turn on PCR until the next beacon transmission time or immediately turn on PCR after reception of the wake-up frame in order to receive the next beacon and then enter the doze state before the next beacon transmission time to correctly receive a PCR beacon, update system parameters and reduce unnecessary power consumption. After system parameter update, the STA can immediately enter a WUR mode without transmitting any signal or frame to the AP and PCR of the STA can immediately enter the doze state to reduce unnecessary power consumption.

If the AP attempts to allow WUR STAs to receive a DTIM (or DTIM beacon) and then receive a group addressed BU (e.g., broadcast/multicast data), the AP includes DTIM reception indication information or group address BU (e.g., broadcast/multicast data) reception indication information in a WUF and transmits the WUF including the information. When the AP transmits the WUF to WUR STAs operating in the duty cycle mode, the AP transmits the WUF including DTIM reception indication information (i.e., information for group address BU reception) in on-durations of the STAs to wake the STAs up. Here, the AP may selectively include a DTIM count value along with the DTIM reception indication information (i.e., information for group address BU reception) in the WUF.

When the WUF STAs receive the WUF including the DTIM reception indication information and the DTIM count value (when the WUF including the information), the WUF STAs can regard the WUF as a WUF transmitted for DTIM reception. The WUF STAs calculate the next DTIM beacon transmission time based on the DTIM count value and a beacon interval, wake up before the next DTIM beacon transmission time and wait for DTIM reception.

When the DTIM count information is not included in the WUF, the WUF STAs may calculate the next DTIM transmission time based on a previously stored DTIM period and DTIM transmission time. The WUF STAs may wake up at the DTIM transmission time to receive a DTIM and receive a group addressed BU transmitted thereafter.

If the next target beacon is a DTIM beacon, the AP may include next beacon reception indication information instead of the DTIM reception indication information and the DTIM count in the WUF and transmit the WUF including the next beacon reception indication information. When a WUR STA has received the next beacon, if the next beacon is a DTIM beacon (i.e., DTIM Count=0) and indicates that a group addressed BU is to be transmitted (e.g., a bit corresponding to a broadcast AID (e.g., AID0) for the BSS of the STA is set to 1 in a TIM element), the STA waits for reception of a group addressed BU transmitted after the DTIM beacon and receives the group addressed BU.

Figure 20:
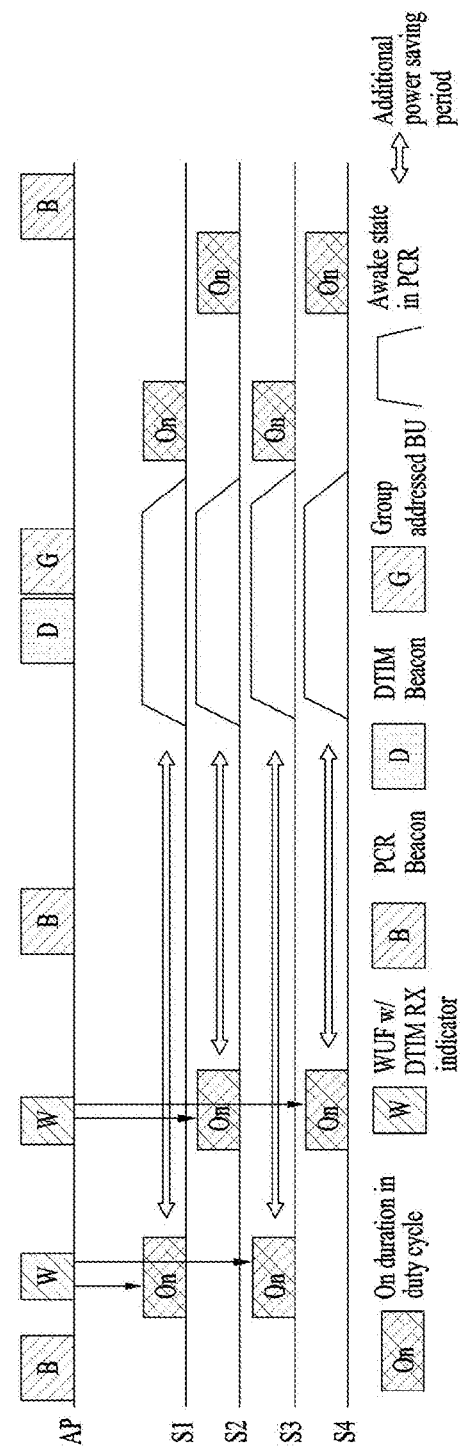
FIG. 20 shows an example of WUF transmission of an AP for DTIM beacon reception of an STA according to an embodiment of the present disclosure.

FIG. 20 shows an example of WUF transmission of an AP for DTIM beacon reception of an STA according to an embodiment of the present disclosure.

In FIG. 20, if the AP attempts to transmit a WUF for DTIM beacon reception or group address BU (e.g., broadcast/multicast data) reception of STAs, the AP includes next DTIM beacon reception indication information (or information indicating group addressed frame reception or information indicating group addressed frame transmission) in the WUF, selectively includes DTIM count information in the WUF and transmits the WUF. The AP transmits the WUF to STAs operating in the duty cycle mode in on-durations of the STAs.

STA1 to STA4 receive the WUF in on-durations thereof. Since the WUF includes the next DTIM beacon reception indication information (or information indicating group addressed frame reception or information indicating group addressed frame transmission) and the DTIM count information, the STAs regard the WUF as a WUF for DTIM beacon or group address BU reception and complete a PCR on procedure at the corresponding DTIM beacon transmission time (or group addressed frame transmission time) to reduce unnecessary power consumption. That is, the STAs can delay a start time of 'PCR on'. It is desirable that the WUF be a broadcast wakeup frame. An additional power saving period is a period in which unnecessary power consumption can be reduced as compared to a conventional procedure. Alternatively, an STA which has received a wake-up frame including information for reception of a group addressed frame or group address BU reception information enters a doze state before a PCR (e.g., Wi-Fi) DTIM beacon transmission time (e.g., next DTIM TBTT) (or group addressed frame transmission time), switches to an awake state at the PCR (e.g., Wi-Fi) DTIM beacon transmission time (e.g., next DTIM TBTT) (or group addressed frame transmission time) and receives a DTIM beacon and/or a group addressed frame.

In addition, STAs which have received a wake-up frame or a broadcast wake-up frame including information indicating that the STAs need to wake up for DTIM reception and group addressed BU (e.g., broadcast/multicast data) reception may correctly receive a DTIM and a group addressed frame at a DTIM transmission time. Upon correct reception of a group addressed BU/frame transmitted thereafter, the STAs can immediately enter a WUR mode without transmitting any signaling or frame to the AP. This method reduces power consumption of STAs. In this case, PCR of STAs immediately enters a doze state and thus unnecessary power consumption can be reduced.

To indicate next Beacon reception or next DTIM reception, the wake-up frame may include a wake-up reason field.

FIG. 21 shows a wake-up frame format including a wake-up reason field according to an embodiment of the present disclosure.

Table 1 shows an exemplary 1-bit wake-up reason field.

TABLE 1

| value | description |
|---|---|
| 0 | Next Beacon reception |
| 1 | Next DTIM reception, DTIM Count is present in this frame |

Table 2 shows an exemplary 2-bit wake-up reason field.

TABLE 2

| value | description |
|---|---|
| 0 | Next Beacon reception |
| 1 | Next DTIM reception, DTIM Count is present in this frame |
| 2 | Normal wake-up (i.e., immediate wake-up). After receiving this frame, the STA starts the wake-up procedure immediately. |

The wake-up reason field may be included only in the broadcast wake-up frame.

Wake-up indication included in a unicast wake-up frame may be configured as shown in Table 3. Table 3 shows an exemplary 2-bit broadcast wake-up indication.

TABLE 3

| value | description |
|---|---|
| 0 | No broadcast wake-up. STA performs only Unicast wake-up operation |
| 1 | Unicast wake-up + Broadcast wake-up for Beacon reception |
| 2 | Unicast wake-up + Broadcast wake-up for DTIM & Group addressed BU |
| 3 | Unicast wake-up + Broadcast wake-up for Beacon and Group addressed BU |

Referring to Table 3, (i) when wake-up indication is set to 0, an STA performs only a unicast wake-up operation (e.g., receives unicast data from an AP after transmitting a response frame to the AP). (ii) When the wake-up indication is set to 1, the STA performs the unicast wake-up operation and a PCR beacon reception operation. Here, the STA can enter a doze state before next beacon reception after the unicast wake-up operation. (iii) When the wake-up indication is set to 2, the STA performs the unicast wake-up operation and a DTIM beacon and group addressed BU reception operation. The STA can enter a doze state before the next DTIM beacon is received after the unicast wake-up operation. (iv) When the wake-up indication is set to 3, the STA performs the unicast wake-up operation, a beacon reception operation and the DTIM beacon and group addressed BU reception operation. The STA can enter a doze state before the next beacon transmission time after the unicast wake-up operation and enter a doze state before DTIM beacon reception.

Alternatively, the wake-up indication information may be represented as a type field as shown in Table 4.

TABLE 4

| Frame Type | description |
|---|---|
| x | Only Unicast wake-up |
| x + 1 | Unicast wake-up + Broadcast wake-up for Beacon reception |
| x + 2 | Unicast wake-up + Broadcast wake-up for DTIM & Group addressed BU |
| x + 3 | Unicast wake-up + Broadcast wake-up for Beacon and Group addressed BU |

Referring to Table 4, (i) when the frame type is set to x, an STA performs only the unicast wake-up operation (e.g., receives unicast data from an AP after transmitting a response frame to the AP). (ii) When the frame type is set to x+1, the STA performs the unicast wake-up operation and a PCR beacon reception operation. The STA can enter a doze state before next PCR beacon reception after the unicast wake-up operation. (iii) When the frame type is set to x+2, the STA performs the unicast wake-up operation and a DTIM beacon and group addressed BU reception operation. The STA can enter a doze state before the next DTIM beacon is received after the unicast wake-up operation. (iv) When the frame type is set to x+3, the STA performs the unicast wake-up operation, a PCR beacon reception operation and the DTIM beacon and group addressed BU reception operation. The STA can enter a doze state before the next PCR beacon transmission time after the unicast wake-up operation and enter a doze state before DTIM beacon reception.

Although exemplary methods for providing information indicating transmission of a group addressed frame or information indicating that an STA needs to receive a group addressed frame have been described above, the present disclosure is not limited thereto and the information may be transmitted to STAs in various other forms.

It is possible to solve waste of resources caused when an AP redundantly transmits the wake-up frame by including broadcast wake-up indication in the unicast wake-up frame. In addition, when the AP separately transmits the unicast wake-up frame and the broadcast wake-up frame because the AP has both unicast data and broadcast data, if an STA receives one frame and turns off WUR while immediately turning on PCR, the STA cannot receive the other frame. However, this problem can be solved by including broadcast wake-up indication in the unicast wake-up frame.

The methods proposed in the present disclosure are based on the assumption that an STA operating in the WUR mode has been synchronized with the AP for PCR even if the STA turns on only WUR and operates. Accordingly, as STAs can calculate the next TBTT and the next TDBTT using information such as a beacon interval and a DTIM count when operating in the PCR mode, WUR STAs can ascertain the next target beacon transmission time (TBTT) and the next target DTIM beacon transmission time (TDBTT). However, WURx of STAs needs to store information for calculating the time.

Meanwhile, WUR STAs may be required to receive all WUR beacon frames. In this case, WUR STAs operating in the duty cycle mode wake up at every WUR beacon transmission time to receive a WUR beacon. In this case, the AP may include next beacon reception indication information in a WUR beacon instead of including it in a WUF in an on-duration and transmit the WUR beacon including the next beacon reception indication information. When a WUR STA operating in the duty cycle mode receives the WUR beacon, if the WUR beacon includes the next beacon reception indication information, the STA wakes up at the next TBTT and waits for PCR beacon reception. Accordingly, the STA need not immediately wake up and thus unnecessary power consumption can be reduced. It is not necessary to transmit a WUF to WUR STAs required to receive the WUR beacon in on-durations in order to indicate PCR beacon reception.

Figure 22:
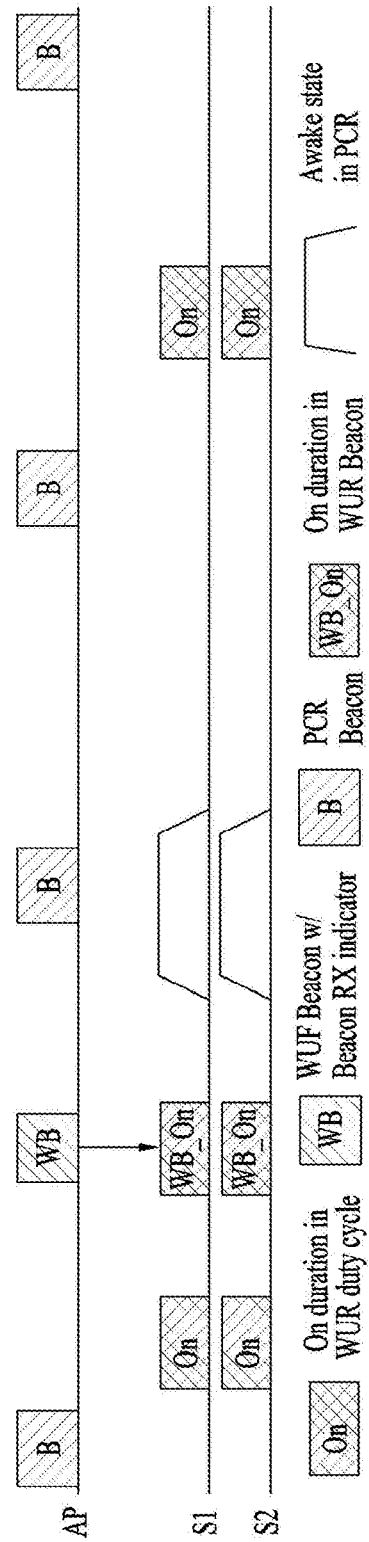
FIG. 22 shows an example of a WUR beacon including next beacon reception indication information.

FIG. 22 shows an example of a WUR beacon including next beacon reception indication information.

In the example of FIG. 22, S1 and S2 wake up at a WUR beacon transmission time and receive a WUR beacon. Since the WUR beacon includes PCR beacon reception indication information, S1 and S2 turn on PCR at the next TBTT and then receive a PCR beacon. Accordingly, the STAs can reduce unnecessary power consumption.

In addition, upon reception of the WUR beacon including information indicating that STAs need to wake up for PCR beacon reception, the STAs can correctly receive the PCR beacon at the next beacon transmission time (next TBTT) to update system parameters. Thereafter, the STAs can immediately enter the WUR mode without transmitting any signaling or frame to the AP.

Further, the AP may include DTIM count information along with DTIM reception indication information in the WUR beacon instead of a WUF and transmit the WUR beacon. Upon acquisition of the DTIM reception indication information and the DTIM count information included in the WUR beacon, the STAs turn on PCR at the DTIM transmission time using the information. That is, the STAs complete the wake-up procedure before the next DTIM transmission time and then wait for DTIM reception. The STAs can receive a group addressed BU transmitted after DTIM reception.

If the DTIM count information is not included in the WUR beacon, the STAs may calculate the next DTIM transmission time using the previously stored DTIM period and DTIM transmission time and wake up at the DTIM transmission time. The STAs receive a DTIM and then receive a group addressed BU transmitted thereafter.

If the next target beacon is a DTIM beacon, the AP may include next beacon reception indication information instead of DTIM reception information (and DTIM count information) in the WUR beacon and transmit the WUR beacon. When a WUR STA receives the next beacon, if the next beacon is a DTIM beacon (i.e., DTIM Count=0) and indicates that a group addressed BU is to be transmitted (e.g., a bit corresponding to the broadcast AID (e.g., AID0) for the BSS of the STA is set to 1 in the TIM element), the STA waits for reception of a group addressed BU transmitted after the DTIM beacon and receives the group addressed BU.

Figure 23:
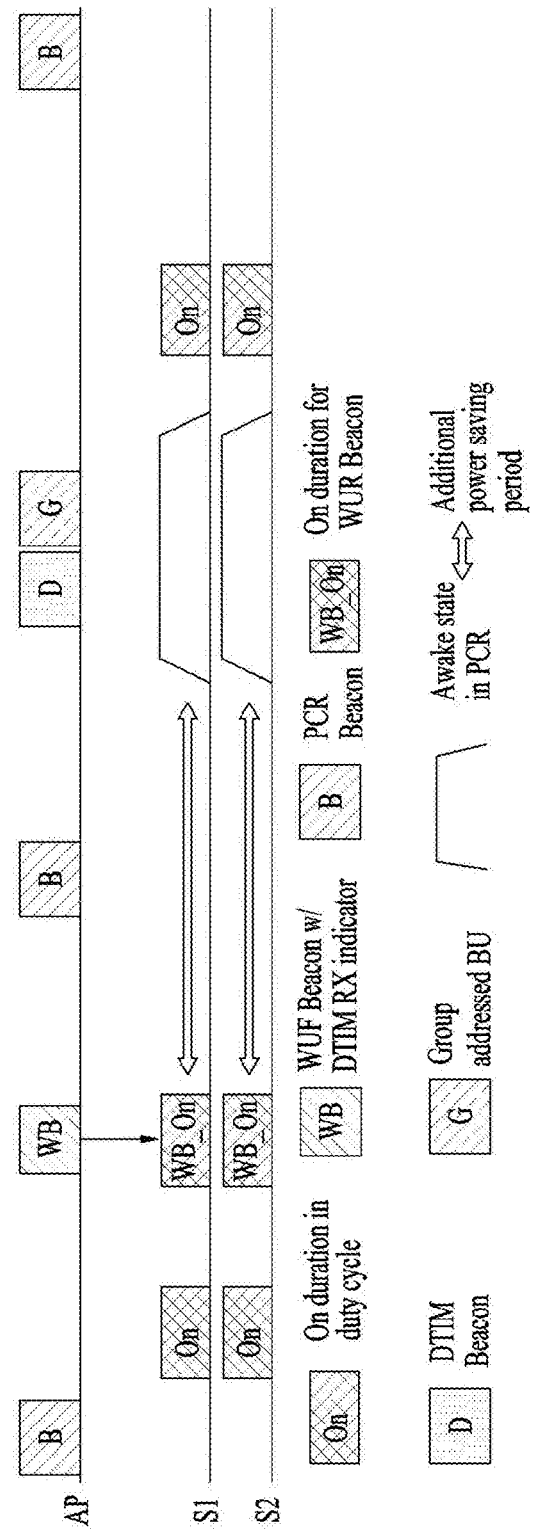
FIG. 23 shows an example of a WUR beacon including next beacon reception indication information according to an embodiment of the present disclosure.

FIG. 23 shows an example of a WUR beacon including next beacon reception indication information according to an embodiment of the present disclosure.

In FIG. 23, S1 and S2 wake up at a WUR beacon transmission time and turn on PCR at the next DTIM transmission time based on DTIM reception indication information and DTIM count information included in the WUR beacon. That is, S1 and S2 complete the wake-up procedure before the next DTIM transmission time and thus can reduce unnecessary power consumption.

In addition, upon reception of the WUR beacon including information indicating that STAs need to wake up for DTIM reception, the STAs can correctly receive the DTIM at the DTIM transmission time and correctly receive a group addressed BU. Thereafter, the STAs can immediately enter the WUR mode without transmitting any signaling or frame to the AP. This method reduces power consumption of STAs.

Meanwhile, in order to indicate next beacon reception or next DTIM reception, the WUR beacon frame may include a wake-up indicator field.

FIG. 24 shows a WUR beacon frame format including the wake-up indicator field according to an embodiment of the present disclosure.

Table 5 shows an exemplary 2-bit wake-up indicator.

TABLE 5

| value | description |
|---|---|
| 0 | No wake-up |
| 1 | Next Beacon reception |
| 2 | Next DTIM reception, DTIM Count is present in this frame |

Table 6 shows an exemplary 1-bit wake-up indicator.

TABLE 6

| Value | Description |
|---|---|
| 0 | No wake-up |
| 1 | Next DTIM beacon reception (or next beacon reception) |

According to another embodiment of the present disclosure, an STA operation for the broadcast wake-up frame instead of the operation of including a beacon reception/DTIM reception indicator in the broadcast wake-up frame may be defined as method 1 or method 2 below.

Method 1: STAs which have received the broadcast wake-up frame may wake up at a TBTT and receive a PCR beacon to update system parameters. Additionally, the STAs may wake up at a DTIM beacon transmission time, check whether a group addressed BU is transmitted, receive the group addressed BU if the group addressed BU is transmitted and then enter the WUR mode. If the DTIM beacon indicates that the group addressed BU is not transmitted, the STAs may receive a PCR DTIM beacon and then enter the WUR mode (after system parameter update as necessary).

Method 2: STAs which have received the broadcast wake-up frame may wake up at a DTIM beacon transmission time, receive a DTIM beacon and also update system parameters. If the DTIM beacon indicates transmission of a group addressed BU, the STAs receive the group addressed BU transmitted after the PCR DTIM beacon and then enter the WUR mode. If the DTIM beacon indicates that the group addressed BU is not transmitted, the STAs may receive the PCR DTIM beacon and then enter the WUR mode (after system parameter update as necessary). Entering the WUR mode may implicitly mean that PCR of an STA enters a doze state, and WUR of an STA in the WUR duty cycle mode can periodically enter the doze state.

Figure 25:
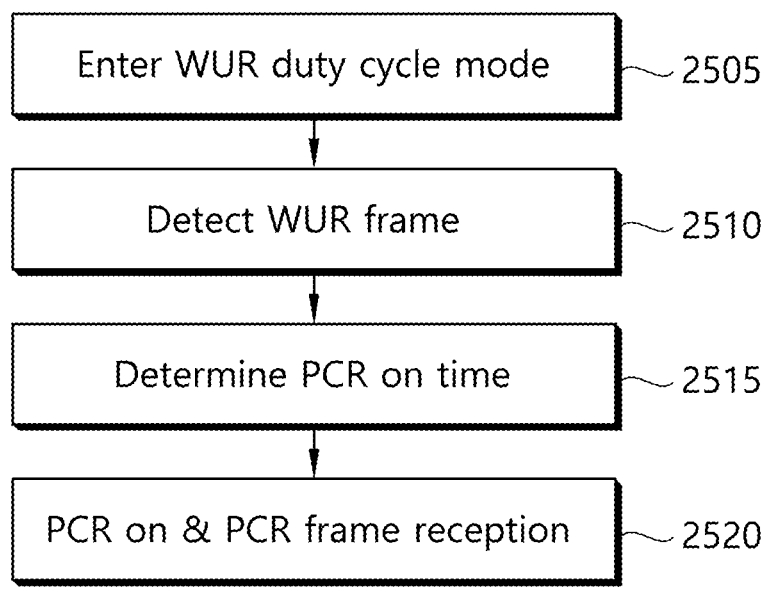
FIG. 25 illustrates a flow of a WUR frame reception method according to an embodiment of the present disclosure.

FIG. 25 illustrates a flow of a method for receiving a WUR frame according to an embodiment of the present disclosure.

Referring to FIG. 25, an STA enters a WUR duty cycle mode in which an on-duration in which a WUR receiver of the STA is awake and an off-duration in which the WUR receiver is asleep are alternated (2505).

The STA detects a WUR frame in an on-duration of the WUR duty cycle mode (2510).

The STA determines a time at which PCR will be turned on based on the WUR frame (2515).

The STA turns on PCR at the determined time and receives a PCR frame (2520)

For example, when the WUR frame indicates reception of a PCR beacon frame or a delivery traffic indication map (DTIM), the STA may turn on PCR after delay of a predetermined time from detection of the WUR frame based on a PCR beacon frame or DTIM transmission time. The STA may determine delay of a predetermined time such that PCR is turned on a transmission time of the PCR beacon frame or the DTIM.

When the WUR frame indicates unicast data reception, the STA may immediately turn on PCR upon detection of the WUR frame.

When the WUR frame indicates PCR beacon frame reception, the STA may receive a PCR beacon frame from an access point (AP) and update system information. The STA may immediately return to the WUR duty cycle mode upon completion of system information update without receiving an instruction from the AP.

When the WUR frame indicates DTIM reception, the STA may receive a DTIM from the AP and receive a group addressed bufferable unit (BU) based on the DTIM.

The STA may immediately return to the WUR duty cycle mode upon completion of the group addressed BU reception without receiving an instruction from the AP.

The WUR frame may be a broadcast WUR frame or a WUR beacon frame.

The WUR frame may include indicator information for indicating reception of a PCR beacon frame, a delivery traffic indication map (DTIM) or unicast data. The indicator information may correspond to a type field or a wake-up indication field of the WUR frame.

Figure 26:
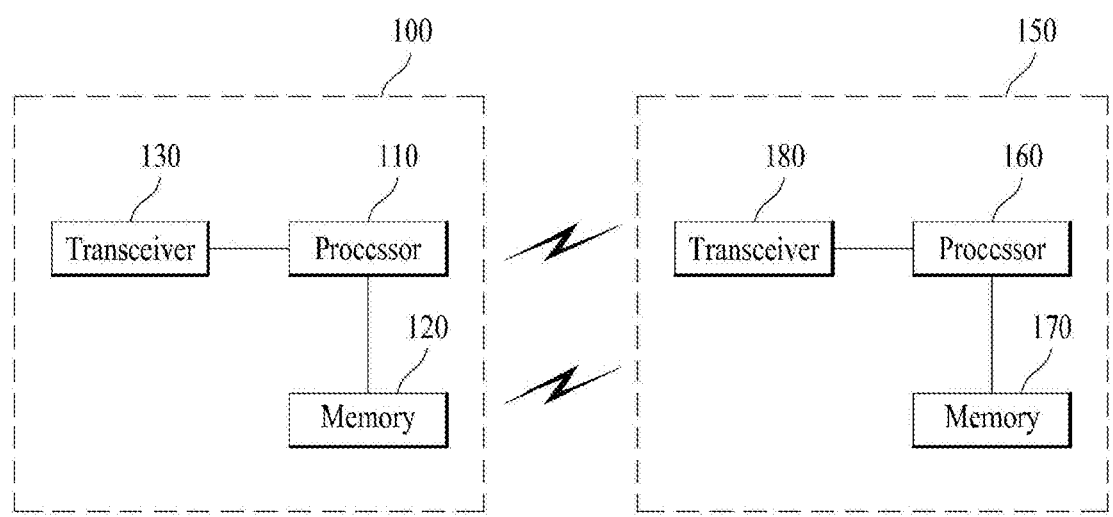
FIG. 26 is a diagram illustrating a device according to an embodiment of the present disclosure.

FIG. 26 is a diagram illustrating a device for implementing the above-described methods.

A wireless device 100 may correspond to a specific STA in the above description and a wireless device 150 may correspond to the above-described AP.

The STA 100 may include a processor 110, a memory 120 and a transceiver 130 and the AP 150 may include a processor 160, a memory 170 and a transceiver 180. The transceivers 130 and 180 may transmit/receive RF signals and may be executed in the physical layer of IEEE 802.11/3GPP and the like. The processors 110 and 160 are executed in the physical layer and/or the MAC layer and connected to the transceivers 130 and 180.

The processors 110 and 160 and the transceivers 130 and 180 may include application-specific integrated circuits (ASICs), other chipsets, logic circuits and/or data processors. The memories 120 and 170 may include a read-only memory (ROM), a random access memory (RAM), a flash memory, a memory card, a storage medium and/or other storage units. When an embodiment is executed by software, the above-described methods may be implemented as modules (e.g., processors and functions) which execute the above-described functions. The modules may be stored in the memories 120 and 170 and executed by the processors 110 and 160. The memories 120 and 170 may be positioned inside or outside the processors 110 and 160 and connected to the processors 110 and 160 through known means.

The transceiver 130 of the STA may include a transmitter (not shown) and a receiver (not shown). The receiver of the STA may include a primary connectivity radio receiver for receiving a primary connectivity radio (e.g., WLAN such as IEEE 802.11 a/b/g/n/ac/ax) signal and a WUR receiver for receiving a WUR signal. The transmitter of the STA may include a primary connectivity radio transmitter for transmitting a primary connectivity radio signal.

The transceiver 180 of the AP may include a transmitter (not shown) and a receiver (not shown). The transmitter of the AP may correspond to an OFDM transmitter. The AP may transmit a WUR payload according to OOK by reusing the OFDM transmitter. For example, the AP may OOK-modulate the WUR payload through the OFDM transmitter, as described above.

The detailed description of the preferred embodiments of the present disclosure has been given to enable those skilled in the art to implement and practice the present disclosure. Although the present disclosure has been described with reference to the preferred embodiments, those skilled in the art will appreciate that various modifications and variations can be made in the present disclosure without departing from the spirit or scope of the present disclosure described in the appended claims. Accordingly, the present disclosure should not be limited to the specific embodiments described herein, but should be accorded the broadest scope consistent with the principles and novel features disclosed herein.

INDUSTRIAL APPLICABILITY

The present disclosure can be applied to various wireless communication system including IEEE 802.11.

What is claimed is:

1. A method performed by a station (STA) in a wireless local area network (WLAN), the method comprising:
   entering a wake-up radio (WUR) mode in which an on-duration during which a WUR receiver of the STA is awake and an off-duration during which the WUR receiver is asleep are alternated;
   receiving, from an access point (AP), a WUR frame during the on-duration of the WUR mode,
   wherein the WUR frame includes a first part followed by a second part, wherein the first part includes a legacy-short training field (L-STF) followed by a legacy-long training field (L-LTF) followed by a legacy-signal (L-SIG), and wherein the second part includes a WUR control field followed by a WUR data field, and wherein the WUR control field and the WUR data field are configured based on an On Off Keying (OOK) modulation,
   wherein a group address bufferable unit (BU) field having a length of one bit is configured in the WUR frame, and the group address BU field includes information related to whether group addressed frames are buffered at the AP;
   determining whether to remain in a doze state of a primary connectivity radio (PCR) of the STA until a next delivery traffic indication map (DTIM) transmission time based on the group address BU field; and
   turning on the PCR after a determination of whether to remain in the doze state, and receiving a group addressed BU.

2. The method of claim 1, wherein the group address BU field is included in the WUR data field, and
   wherein the STA determines to remain in the doze state until the next DTIM based on the group address BU field having a value of '1'.

3. The method of claim 1, wherein the WUR data field is modulated based on a 13 subcarrier tone sequence and has a subcarrier spacing of 312.5 kHz.

4. A station (STA) configured to operate in a wireless local area network (LAN), the STA comprising:
   wake-up radio (WUR) receiver; and
   a processor,
   wherein the processor is configured to:
   enter a WUR mode in which an on-duration during which the WUR receiver is awake and an off-duration during which the WUR receiver is asleep are alternated;
   receive, from an access point (AP), a WUR frame during the on-duration of the WUR mode,
   wherein the WUR frame includes a first part followed by a second part, wherein the first part includes a legacy-short training field (L-STF) followed by a legacy-long training field (L-LTF) followed by a legacy-signal (L-SIG), and wherein the second part includes a WUR control field followed by a WUR data field, and wherein the WUR control field and the WUR data field are configured based on an On Off Keying (OOK) modulation,
   wherein a group address bufferable unit (BU) field having a length of one bit is configured in the WUR frame, and the group address BU field includes information related to whether group addressed frames are buffered at the AP;
   determine whether to remain in a doze state of a primary connectivity radio (PCR) of the STA until a next delivery traffic indication map (DTIM) transmission time based on the group address BU field; and
   turn on the PCR after a determination of whether to remain in the doze state, and receive a group addressed BU.

5. The station of claim 4, wherein the group address BU field is included in the WUR data field, and
   wherein the STA determines to remain in the doze state until the next DTIM based on the group address BU field having a value of '1'.

6. The station of claim 4, wherein the WUR data field is modulated based on a 13 subcarrier tone sequence and has a subcarrier spacing of 312.5 kHz.

* * * * *